(12) United States Patent
Huang

(10) Patent No.: US 7,373,950 B2
(45) Date of Patent: May 20, 2008

(54) CERAMIC CONTROL VALVE

(76) Inventor: Ching Yu Huang, No. 22, Lane 115, Sec. 1, Youyuan Rd., Dadu Township, Taichung County 432 (TW)

( * ) Notice: Subject to any disclaimer, the term of this patent is extended or adjusted under 35 U.S.C. 154(b) by 475 days.

(21) Appl. No.: 11/052,871

(22) Filed: Feb. 9, 2005

(65) Prior Publication Data

US 2006/0174955 A1    Aug. 10, 2006

(51) Int. Cl.
*F16K 11/078* (2006.01)
*F16C 11/06* (2006.01)

(52) U.S. Cl. .............. 137/625.17; 137/625.4; 137/636.3; 403/122

(58) Field of Classification Search ........... 137/625.17, 137/625.4, 636.3; 403/121, 122, 159, 165, 403/244; 464/106
See application file for complete search history.

(56) References Cited

U.S. PATENT DOCUMENTS

| | | | |
|---|---|---|---|
| 2,780,080 A * | 2/1957 | Gordon | 464/106 |
| 3,965,936 A * | 6/1976 | Lyon | 137/625.4 |
| 4,088,153 A * | 5/1978 | Paasikivi | 137/625.4 |
| 4,183,377 A * | 1/1980 | Bernat | 137/625.4 |
| 5,329,958 A * | 7/1994 | Bosio | 137/625.4 |
| 5,490,540 A * | 2/1996 | Vom Dahl et al. | 137/625.4 |
| 5,851,151 A * | 12/1998 | Reynolds | 464/106 |
| 5,857,489 A * | 1/1999 | Chang | 137/625.4 |
| 6,113,301 A * | 9/2000 | Burton | 403/122 |
| 6,209,581 B1 * | 4/2001 | Gyozo | 137/625.4 |
| 6,439,581 B1 * | 8/2002 | Chang | 137/625.4 |
| 6,907,903 B1 * | 6/2005 | Chang | 137/625.17 |

* cited by examiner

*Primary Examiner*—John Rivell
(74) *Attorney, Agent, or Firm*—Egbert Law Offices

(57) ABSTRACT

A ceramic control valve includes a valve casing, and a control device including a linking seat and a control lever. The drive block of the control lever has a spherical surface. The receiving hole of the linking seat has a wall having a first portion in contact with the spherical surface of the drive block and a second portion spaced from the spherical surface of the drive block, thereby forming a plurality of gaps. Thus, the gaps located between the drive block and the receiving hole keep a smooth circulation of the air flow, thereby preventing the drive block from being jammed in the receiving hole due to deformation of heat expansion, so that the control lever is operated normally.

7 Claims, 15 Drawing Sheets

U.S. 7,373,950 B2

CERAMIC CONTROL VALVE

BACKGROUND OF THE INVENTION

1. Field of the Invention

The present invention relates to a ceramic control valve, and more particularly to a ceramic control valve mounted on a faucet to control the mixing proportion of cold/hot water and the output flow rate of the faucet.

2. Description of the Related Art

A conventional ceramic control valve for a faucet in accordance with the prior art shown in FIGS. 18-21 comprises a valve casing 4, and a control device mounted in the valve casing 4 and including a fixing disc 33, a movable 32 disc laminating and movable relative to the fixing disc 33 to change a mixing proportion of cold and hot water and an output flow rate of the faucet, a linking seat 31 secured on the movable disc 32 and having a receiving hole 310, a lever seat 34 laminating the linking seat 31, and a control lever 3 rotatably mounted in the lever seat 34 by a shaft 301 and having a first end protruding from the valve casing 4 and a second end formed with a drive block 30 inserted into the receiving hole 310 of the linking seat 31. Preferably, the control lever 3 is made of metallic material. Referring to FIG. 22, the control lever 3a is made of plastic material and has a drive block 30a. However, the drive block 30 of the control lever 3 is easily jammed in the receiving hole 310 of the linking seat 31 as shown in FIG. 20 due to deformation caused by a heat expansion, thereby forming a close chamber 5 as shown in FIG. 21, so that the control lever 3 is jammed and cannot be operated normally.

SUMMARY OF THE INVENTION

The present invention is to mitigate and/or obviate the disadvantage of the conventional ceramic control valve.

The primary objective of the present invention is to provide a ceramic control valve, wherein the gaps located between the drive block and the receiving hole keep a smooth circulation of the air flow, thereby preventing the drive block of the control lever from being jammed in the receiving hole due to deformation caused by a heat expansion, so that the control lever is operated normally.

In accordance with one embodiment of the present invention, there is provided a ceramic control valve, comprising:

a valve casing; and a control device mounted in the valve casing and including:

a ceramic disc unit including a fixing disc, and a movable disc laminating and movable relative to the fixing disc to change a mixing proportion of cold and hot water and an output flow rate;

a linking seat secured on the movable disc of the ceramic disc unit and having a receiving hole;

a lever seat laminating the linking seat; and a control lever rotatably mounted in the lever seat and having a first end protruding from the valve casing and a second end formed with a drive block inserted into the receiving hole of the linking seat; wherein the drive block of the control lever has a spherical surface;

the receiving hole of the linking seat has a wall having a first portion in contact with the spherical surface of the drive block and a second portion spaced from the spherical surface of the drive block, thereby forming a plurality of gaps between the second portion of the receiving hole and the spherical surface of the drive block;

the diameter of the drive block is greater than the maximum width of each of the gaps.

In accordance with another embodiment of the present invention, there is provided a linking seat s having a receiving hole to receive a drive block, wherein the drive block has a spherical surface;

the receiving hole has a wall having a first portion in contact with the spherical surface of the drive block and a second portion spaced from the spherical surface of the drive block, thereby forming a plurality of gaps between the second portion of the receiving hole and the spherical surface of the drive block;

the diameter of the drive block is greater than the maximum width of each of the gaps.

Further benefits and advantages of the present invention will become apparent after a careful reading of the detailed description with appropriate reference to the accompanying drawings.

DETAILED DESCRIPTION OF THE INVENTION

Figure 1:
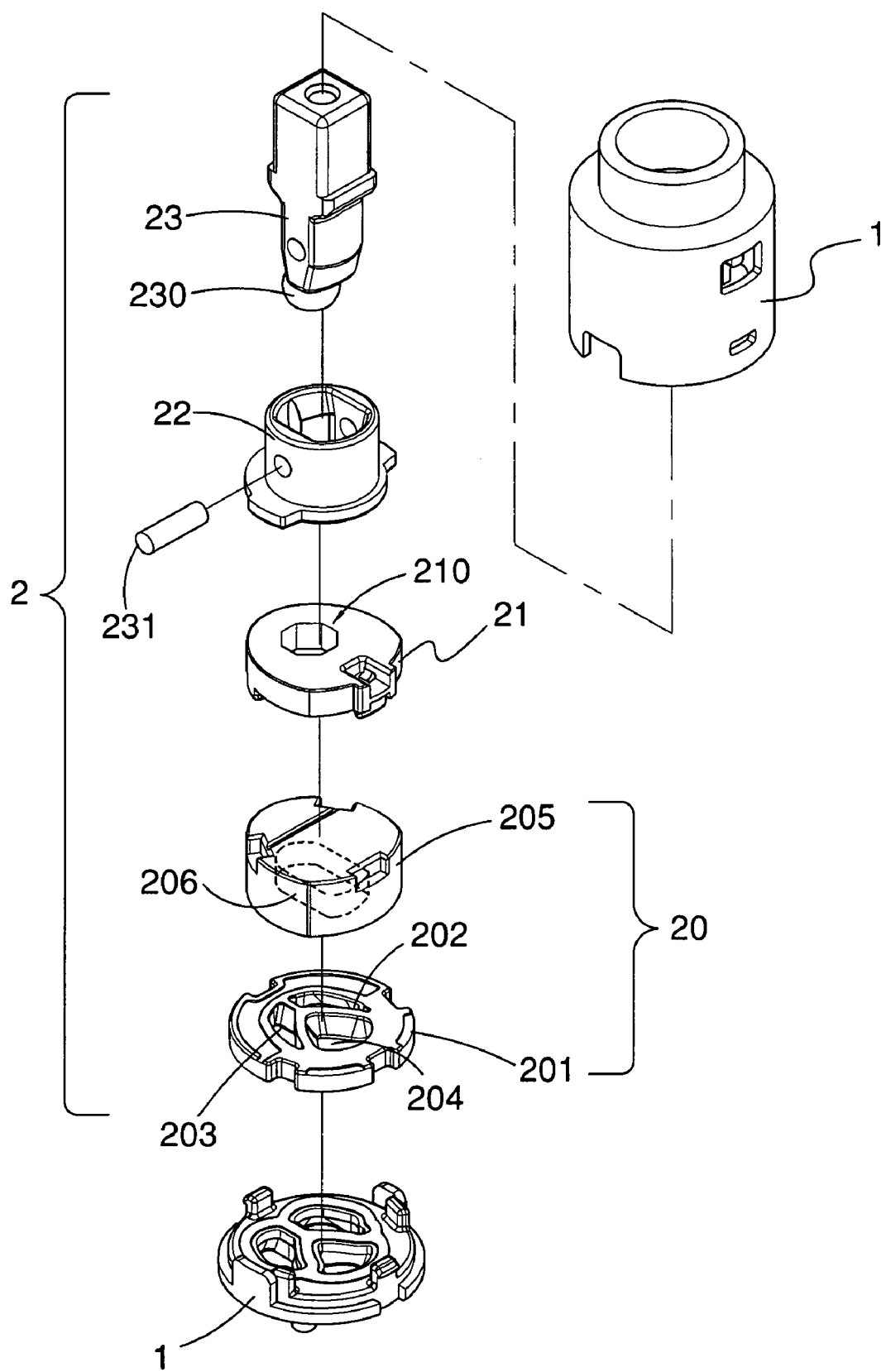
FIG. 1 is an exploded perspective view of a ceramic control valve in accordance with the preferred embodiment of the present invention.

Referring to the drawings and initially to FIG. 1, a ceramic control valve in accordance with the preferred embodiment of the present invention comprises a valve casing 1, and a control device 2 mounted in the valve casing 1. The control device 2 includes a ceramic disc unit 20 including a fixing disc 201 having a hot water inlet 202, a cold water inlet 203 and a water outlet 204, and a movable disc 205 laminating the fixing disc 201 and having a bottom formed with a regulating recess 206, a linking seat 21 secured on the movable disc 205 of the ceramic disc unit 20 and having a receiving hole 210, a lever seat 22 laminating the linking seat 21, and a control lever 23 rotatably mounted in the lever seat 22 and having a first end protruding from the valve casing 1 and a second end formed with a drive block 230. In the preferred embodiment of the present invention, the control lever 23 is pivotally mounted in the lever seat 22 by a shaft 231. Preferably, the control lever 23 is made of plastic material.

Figure 2:
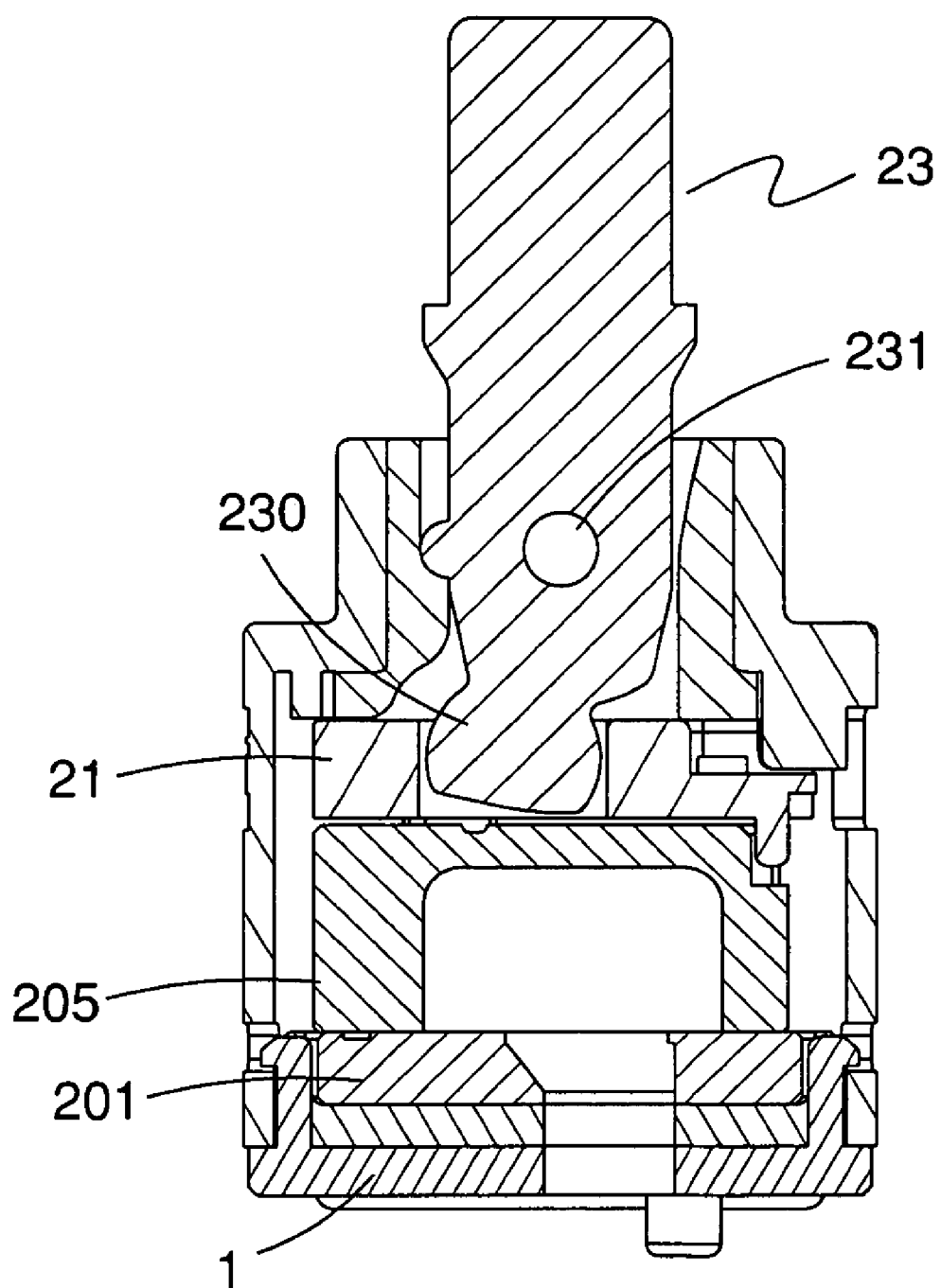
FIG. 2 is a plan cross-sectional assembly view of the ceramic control valve as shown in FIG. 1.

Referring to FIGS. 1 and 2, the drive block 230 of the control lever 23 is semi-spherical and inserted into the receiving hole 210 of the linking seat 21. The control lever 23 is pivoted about the shaft 231 to drive the linking seat 21 to drive the movable disc 205 of the ceramic disc unit 20 to move on the fixing disc 201 of the ceramic disc unit 20 to regulate the water of the hot water inlet 202, the cold water inlet 203 and the water outlet 204 of the fixing disc 201 by the regulating recess 206 of the movable disc 205 so as to control the mixing proportion of cold/hot water and the output flow rate of the faucet. The above-mentioned operation is conventional and will not be further described in detail.

Figure 3:
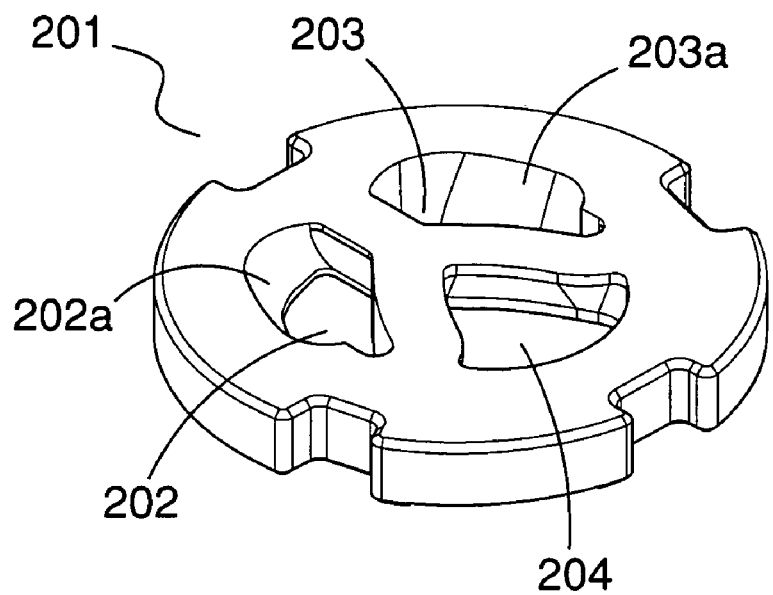
FIG. 3 is a bottom perspective view of a fixing disc of the ceramic control valve as shown in FIG. 1.
Figure 4:
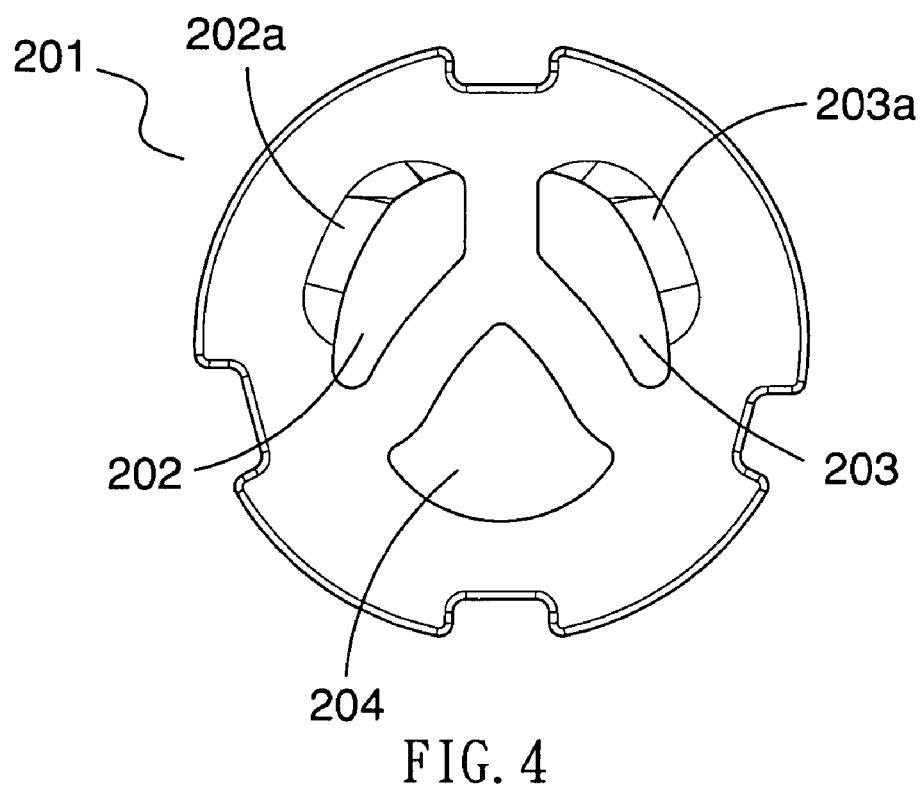
FIG. 4 is a bottom plan view of the fixing disc of the ceramic control valve as shown in FIG. 3.

Referring to FIGS. 3 and 4, the hot water inlet 202 of the fixing disc 201 has a first side having a first inward guiding oblique face 202a having a thickness gradually increased outward from the top face to the bottom face thereof, and the cold water inlet 203 of the fixing disc 201 has a first side having a second inward guiding oblique face 203a having a thickness gradually increased outward from the top face to the bottom face thereof.

Figure 5:
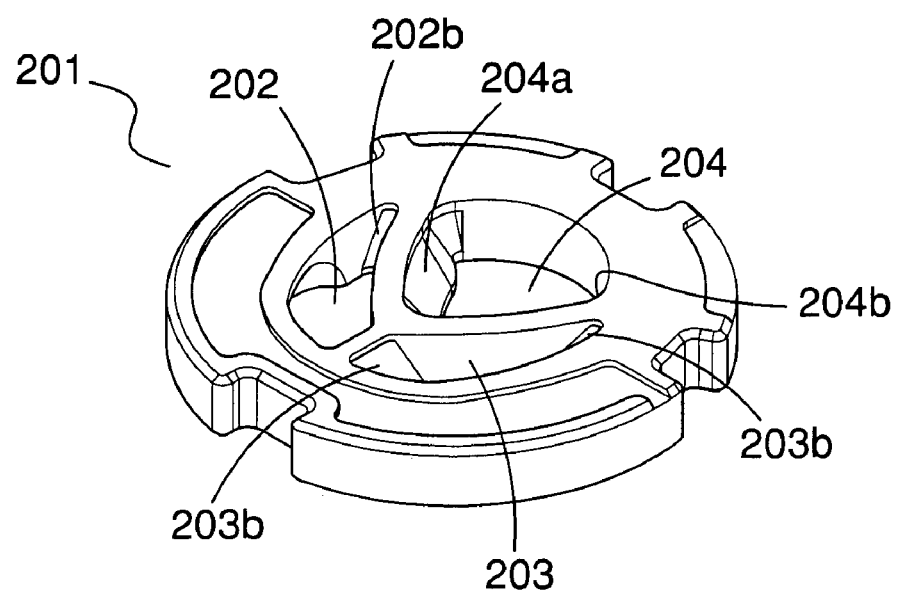
FIG. 5 is a top perspective view of the fixing disc of the ceramic control valve as shown in FIG. 1.
Figure 6:
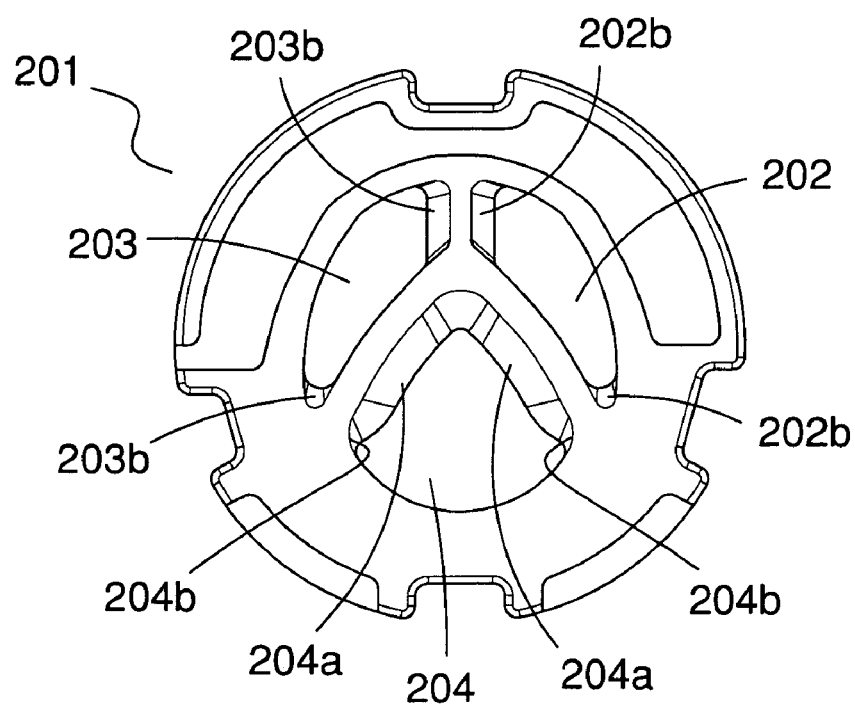
FIG. 6 is a top plan view of the fixing disc of the ceramic control valve as shown in FIG. 5.

Referring to FIGS. 5 and 6, the hot water inlet 202 of the fixing disc 201 has a second side and an end portion opposite to the second side each having a first outward guiding oblique face 202b having a thickness gradually increased outward from the bottom face to the top face thereof, and the cold water inlet 203 of the fixing disc 201 has a second side and an end portion opposite to the second side each having a second outward guiding oblique face 203b having a thickness gradually increased outward from the bottom face to the top face thereof, and the water outlet 204 of the fixing disc 201 has two adjacent guiding oblique faces 204a each having a thickness gradually increased outward from the bottom face to the top face thereof. Each of the two guiding oblique faces 204a of the water outlet 204 has an end portion having an expansion slot 204b extending outward therefrom.

In such a manner, each of the first inward guiding oblique face 202a of the hot water inlet 202 and the second inward guiding oblique face 203a of the cold water inlet 203 has a thickness gradually increased outward from the top face to the bottom face thereof, so that the hot water flow rate of the hot water inlet 202 and the cold water flow rate of the cold water inlet 203 are increased largely, and the hot water of the hot water inlet 202 and the cold water of the cold water inlet 203 are guided smoothly. At the same time, each of the first outward guiding oblique face 202b of the hot water inlet 202 and the second outward guiding oblique face 203b of the cold water inlet 203 has a thickness gradually increased outward from the bottom face to the top face thereof, so that the hot water of the hot water inlet 202 and the cold water of the cold water inlet 203 are guided into the regulating recess 206 of the movable disc 205 largely. In addition, each of the two guiding oblique faces 204a of the water outlet 204 has a thickness gradually increased outward from the bottom face to the top face thereof and has an expansion slot 204b extending outward therefrom, so that the cold and hot water contained in the regulating recess 206 of the movable disc 205 are guided outward from the valve casing 1 of the valve largely and smoothly. Thus, the valve has a larger water flow rate and has a more smooth water flow.

Figure 7:
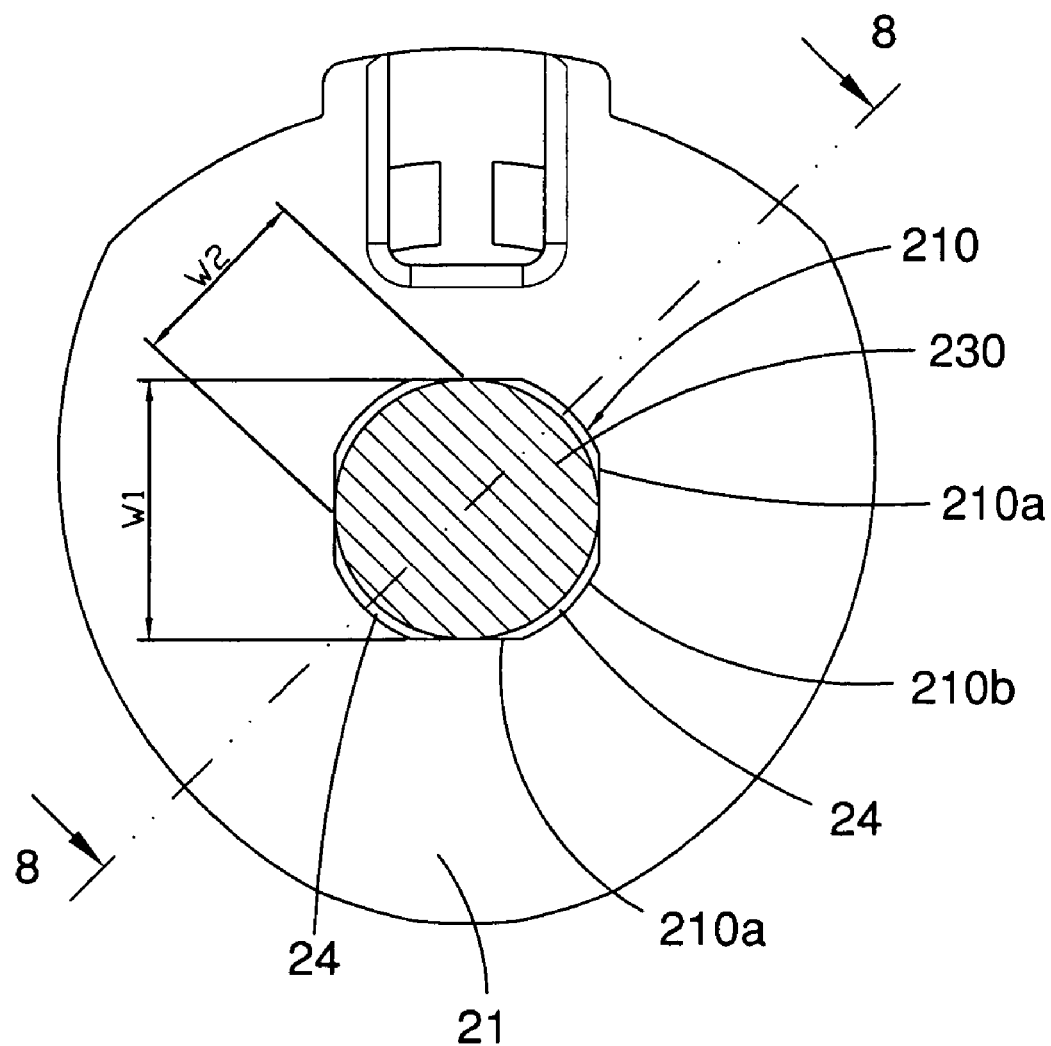
FIG. 7 is a partially top plan cross-sectional assembly view of the ceramic control valve as shown in FIG. 1.

Referring to FIG. 7, the receiving hole 210 of the linking seat 21 has a wall having a first portion and a second portion. In the preferred embodiment of the present invention, the first portion of the receiving hole 210 has four flat faces 210a, and the second portion of the receiving hole 210 has four arcuate faces 210b located between the four flat faces 210a. Thus, when the spherical drive block 230 of the control lever 23 is inserted into the receiving hole 210 of the linking seat 21, the four flat faces 210a (or the first portion) of the receiving hole 210 are rested on the spherical surface of the drive block 230, and the four arcuate faces 210b (or the second portion) of the receiving hole 210 are spaced from the spherical surface of the drive block 230, thereby forming four gaps 24. In addition, the diameter "W1" of the drive block 230 is greater than the maximum width "W2" of each of the four gaps 24.

Figure 8:
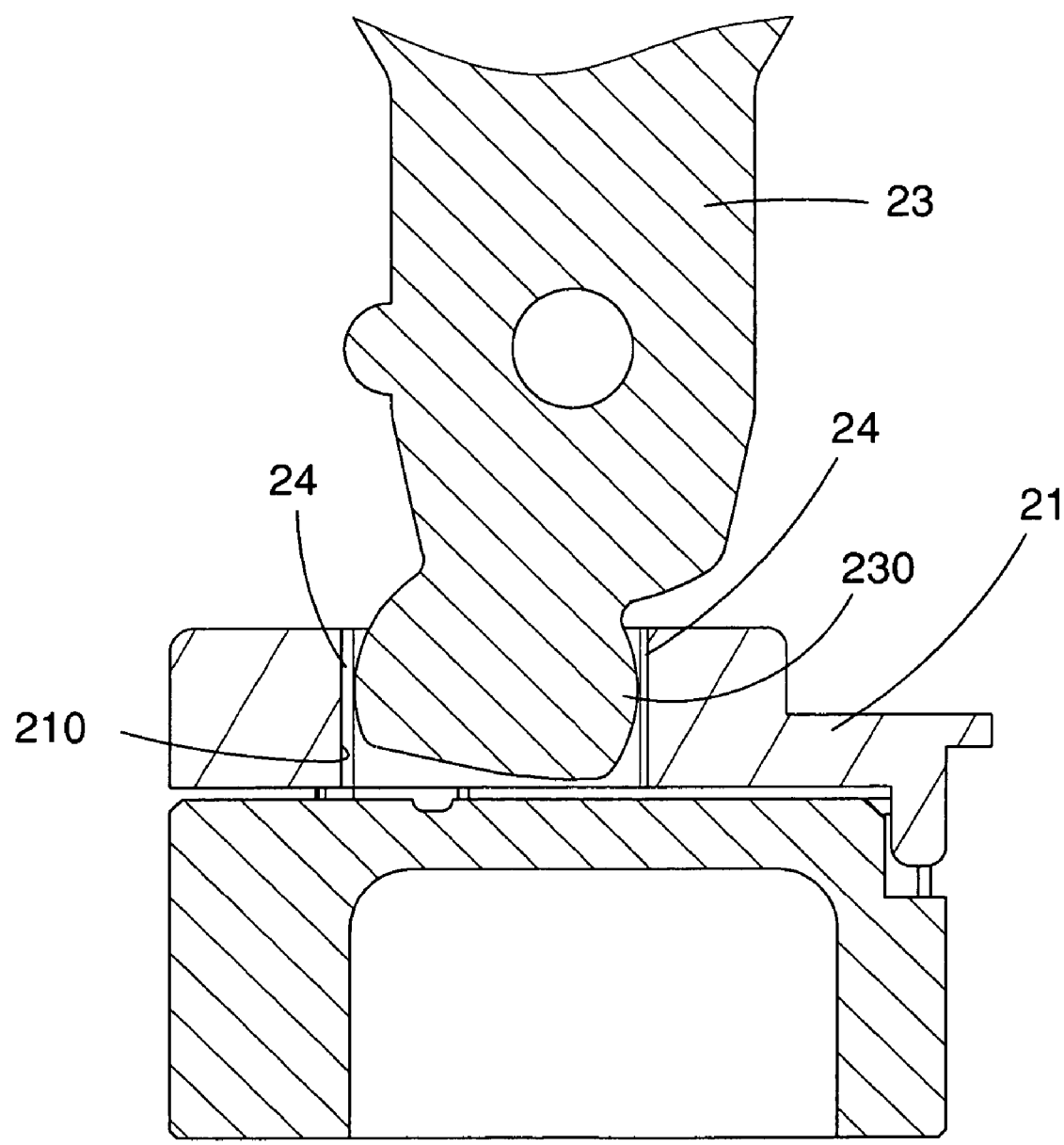
FIG. 8 is a plan cross-sectional view of the ceramic control valve taken along line 8-8 as shown in FIG. 7.
Figure 9:
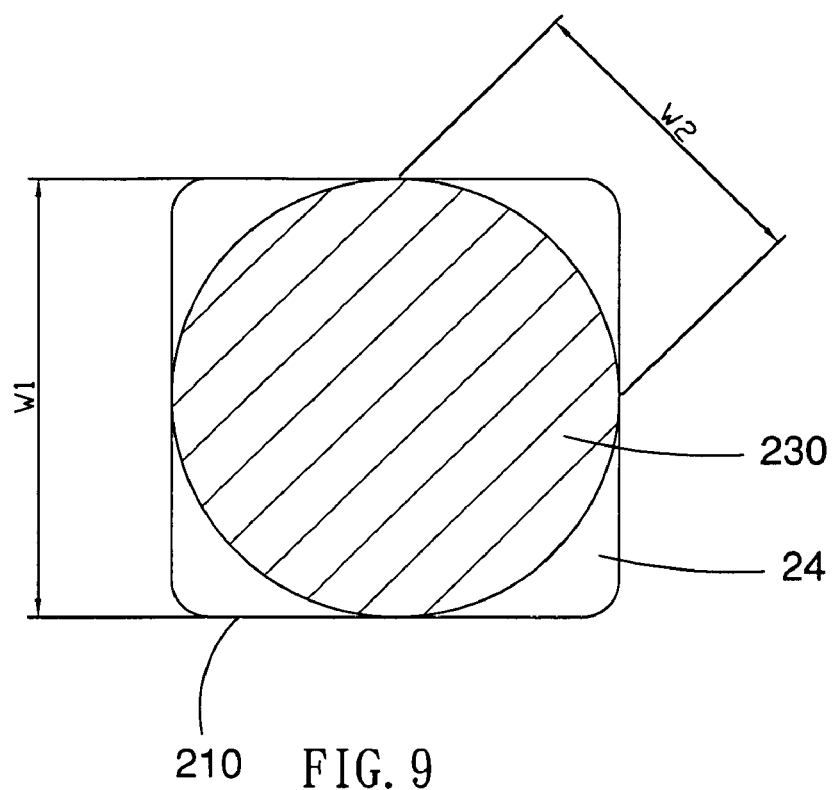
FIGS. 9-15 are plan cross-sectional view of a receiving hole of the ceramic control valve as shown in FIG. 1.
Figure 10:
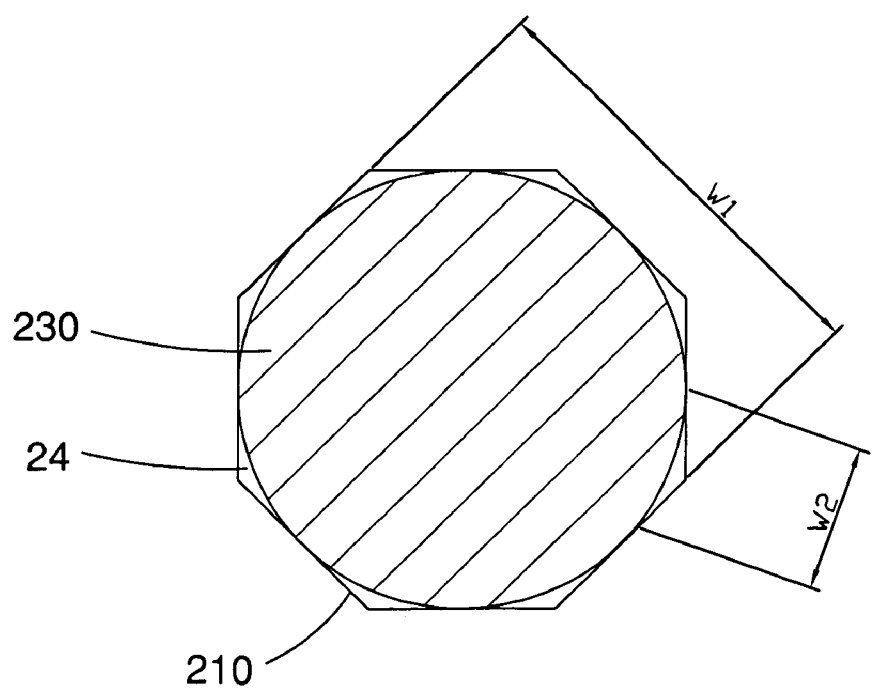
Figure 11:
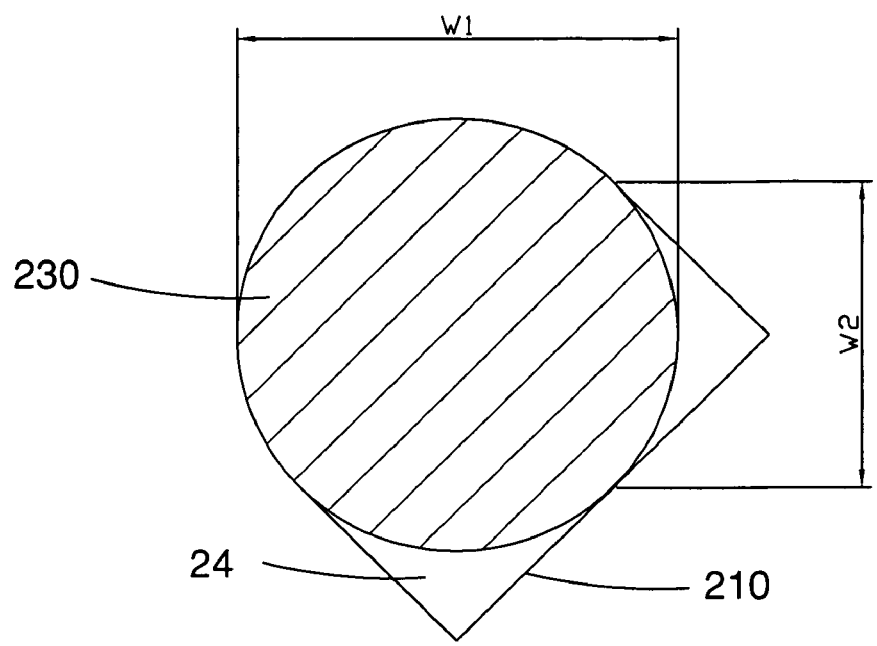
Figure 12:
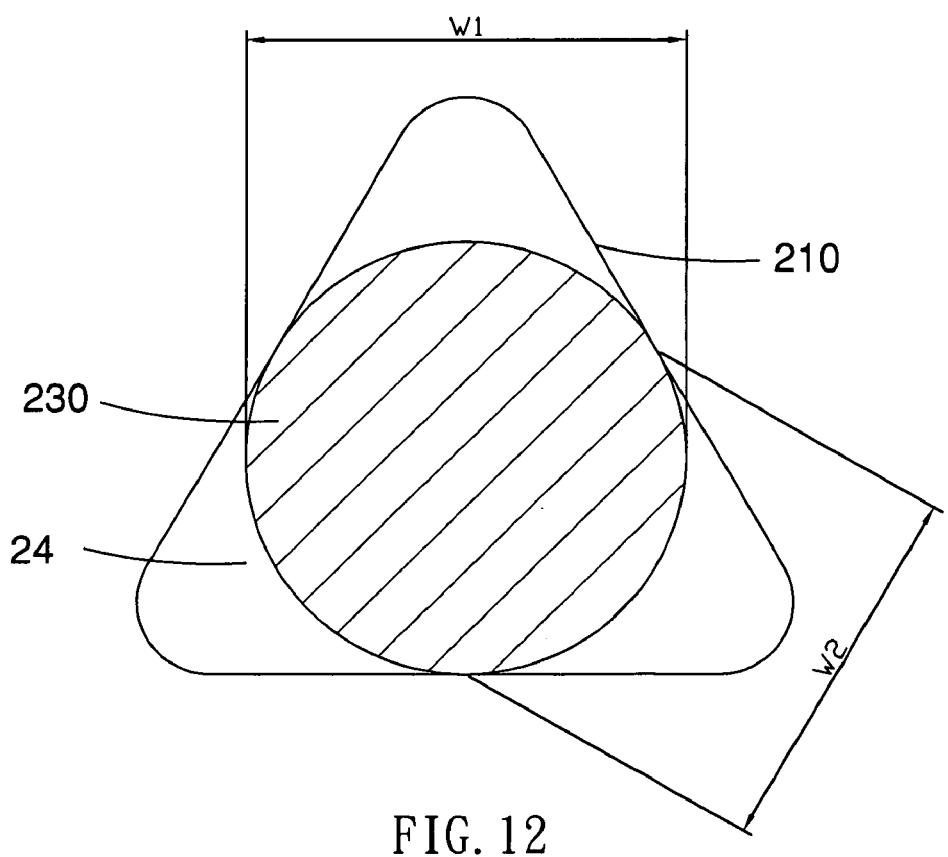
Figure 13:
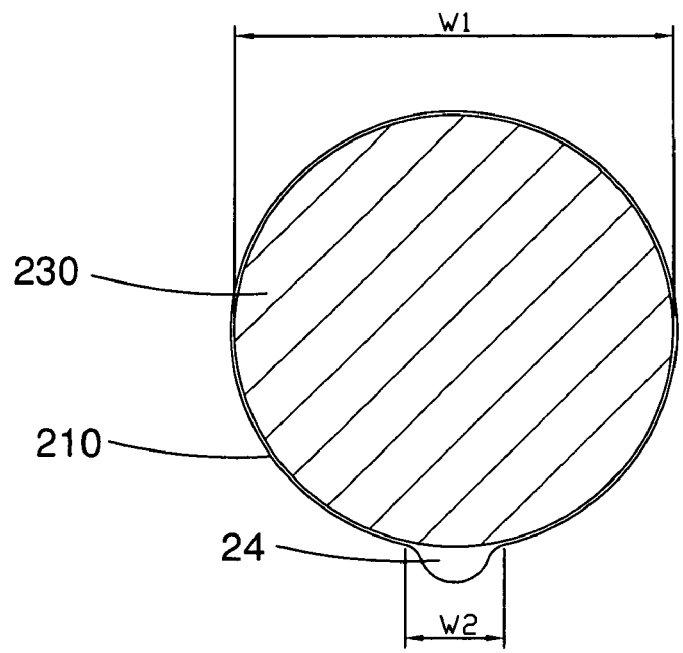
Figure 14:
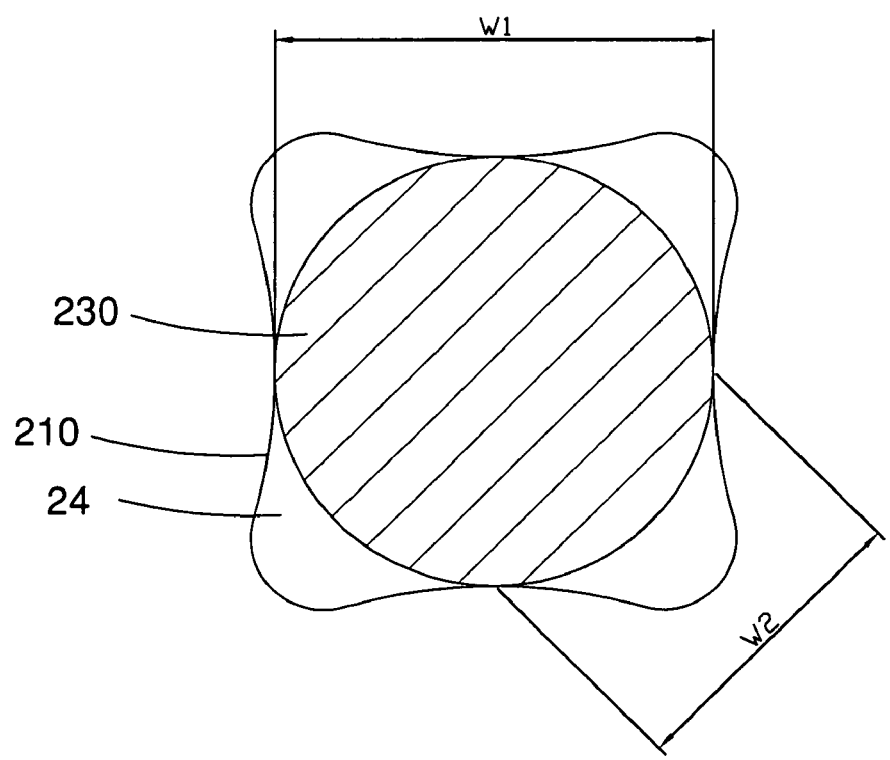
Figure 15:
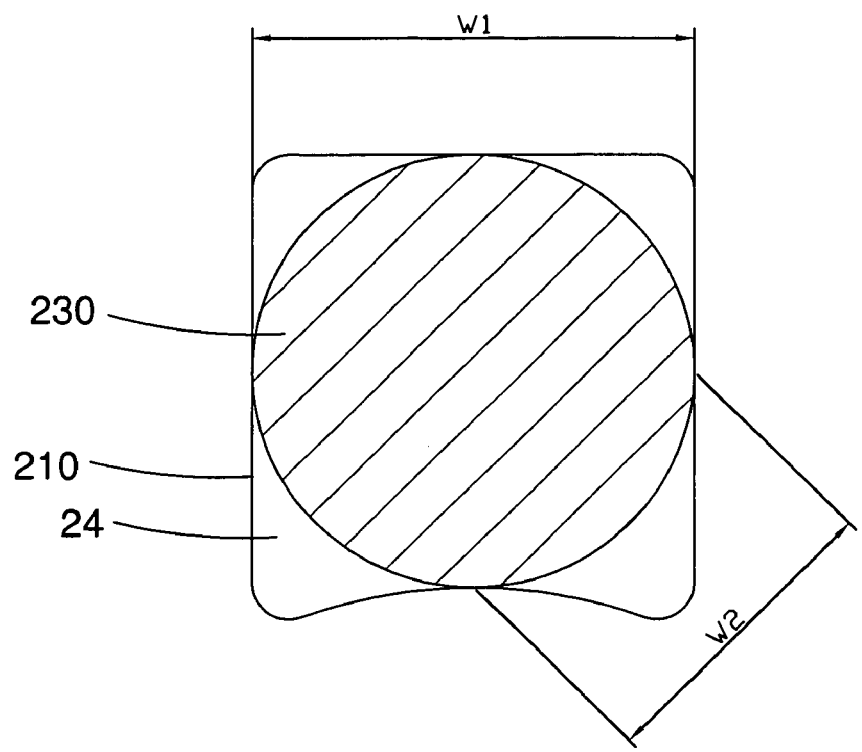

Referring to FIG. 8, the drive block 230 is moved by rotation of the control lever 23 to move the linking seat 21 actually. In addition, the gaps 24 located between the drive block 230 and the receiving hole 210 keep a smooth circulation of the air flow, thereby preventing the drive block 230 of the control lever 23 from being jammed in the receiving hole 210 due to deformation of heat expansion, so that the control lever 23 is operated normally.

Referring to FIGS. 9-15, the receiving hole 210 has various shapes. At this time, the receiving hole 210 has a first portion in contact with and rested on the spherical surface of the drive block 230 and a second portion spaced from the spherical surface of the drive block 230, thereby forming a plurality of gaps 24. In addition, the diameter "W1" of the drive block 230 is greater than the maximum width "W2" of each of the gaps 24.

Figure 16:
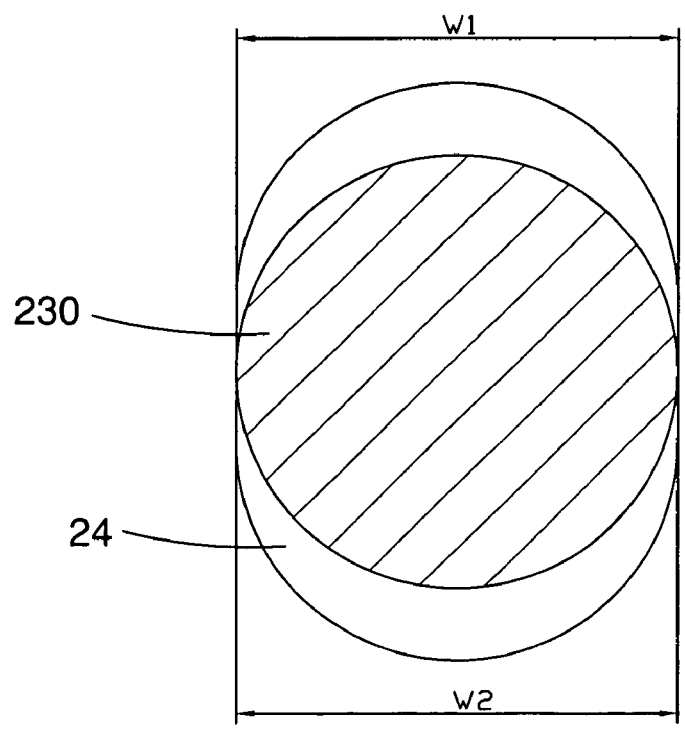
FIG. 16 is a plan cross-sectional view of another receiving hole of the ceramic control valve as shown in FIG. 1.

Referring to FIG. 16, the diameter "W1" of the drive block 230 is equal to the maximum width "W2" of each of the gaps 24, so that the drive block 230 cannot push the linking seat 21 in the Y-axis. Thus, the receiving hole 210 does not have the shape as shown in FIG. 16.

Figure 17:
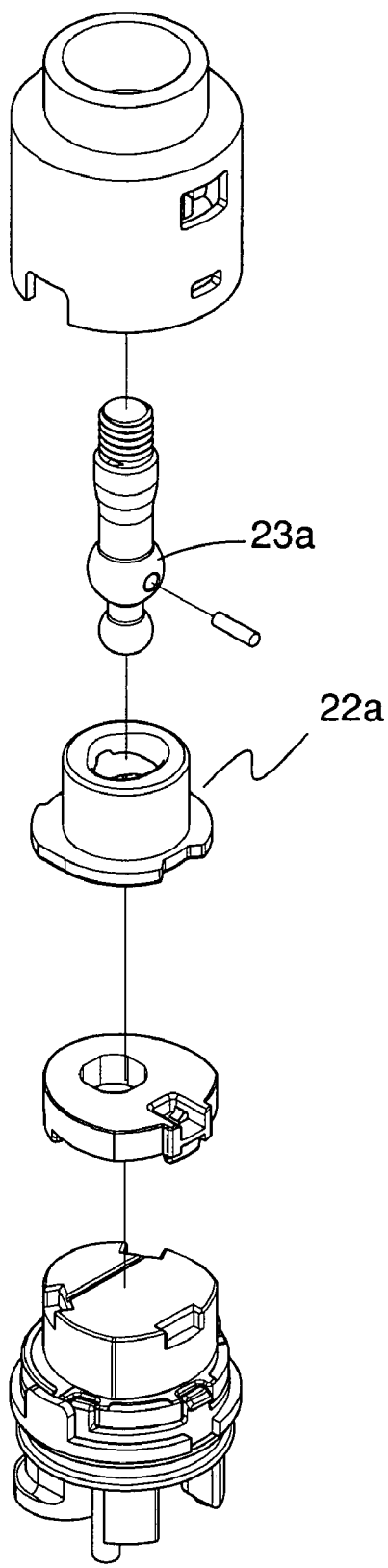
FIG. 17 is an exploded perspective view of a ceramic control valve in accordance with another preferred embodiment of the present invention.
Figure 18:
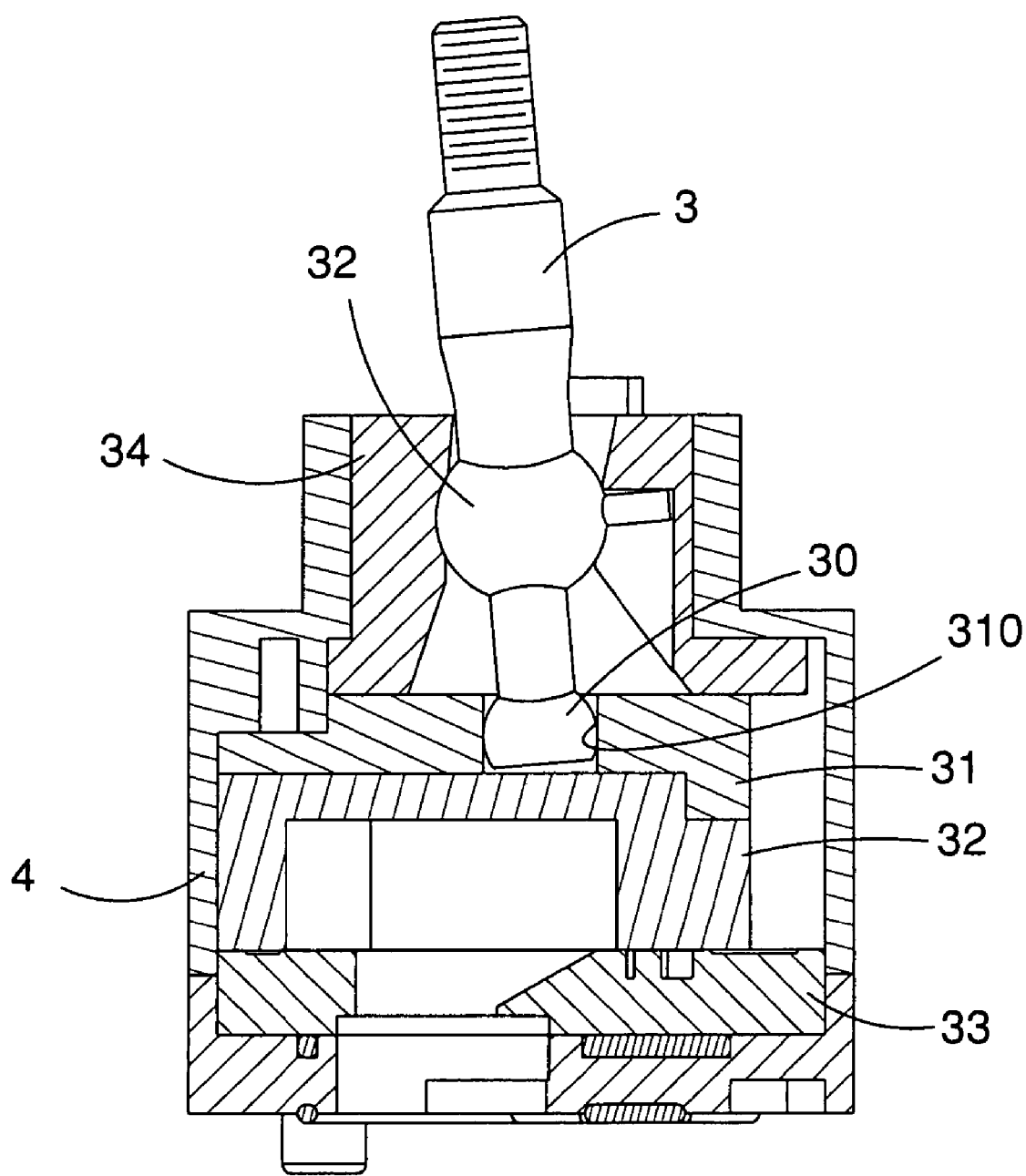
FIG. 18 is a plan cross-sectional assembly view of a conventional ceramic control valve in accordance with the prior art.
Figures 19, 22:
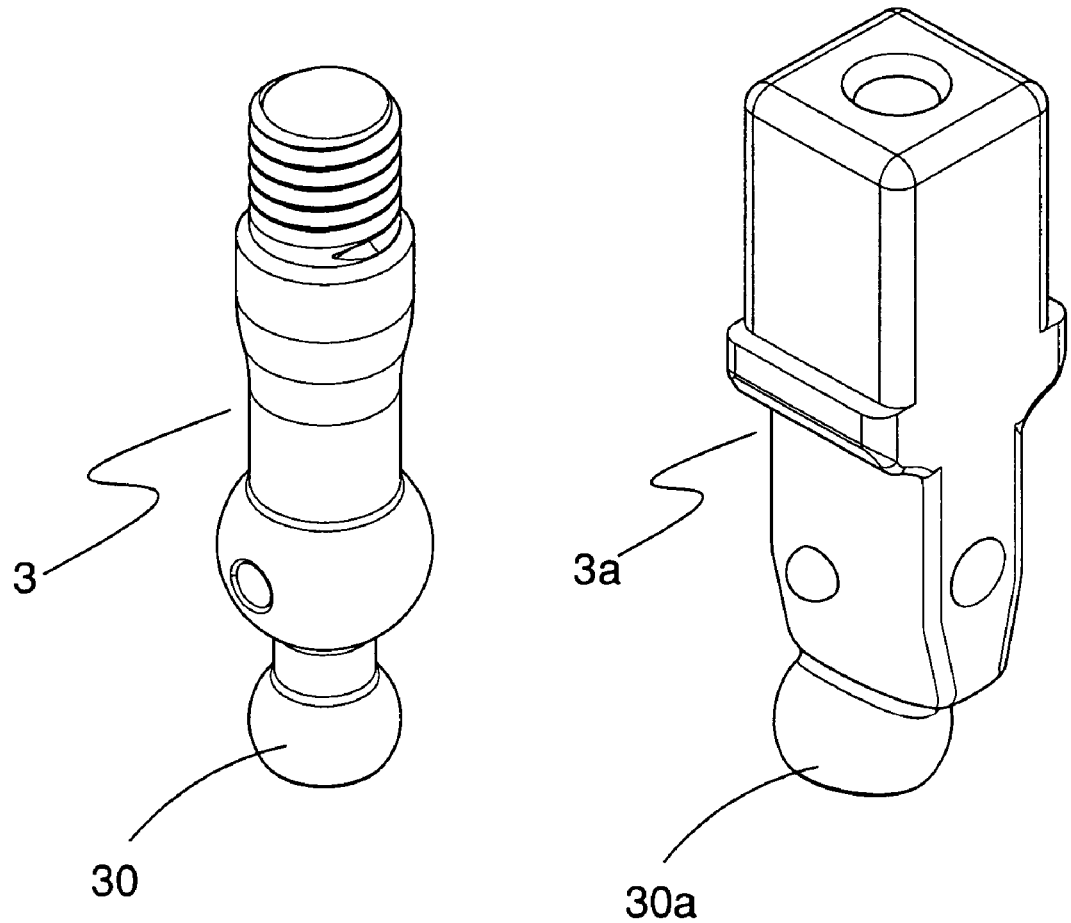
FIG. 19 is a perspective view of a control lever of the conventional ceramic control valve as shown in FIG. 18.
FIG. 22 is a perspective view of another control lever of a conventional ceramic control valve in accordance with the prior art.
Figure 20:
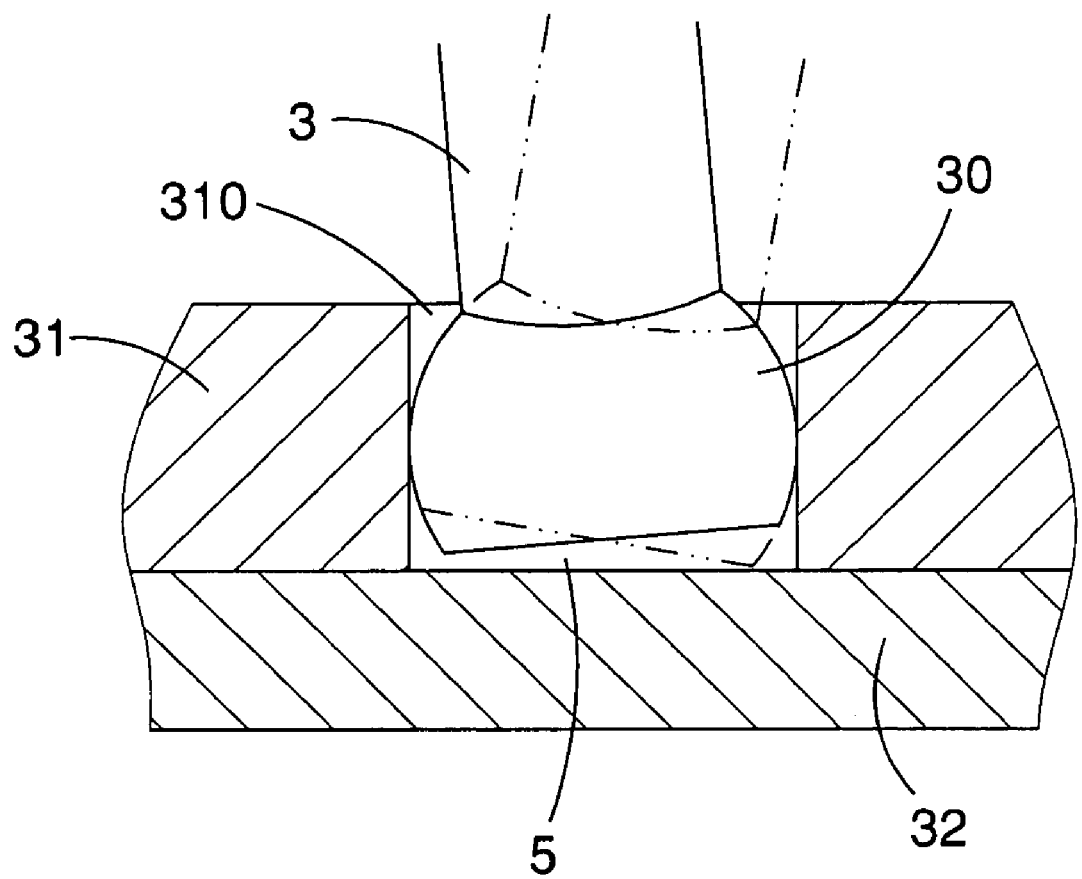
FIG. 20 is a partially cut-away enlarged operational view of the conventional ceramic control valve as shown in FIG. 18.
Figure 21:
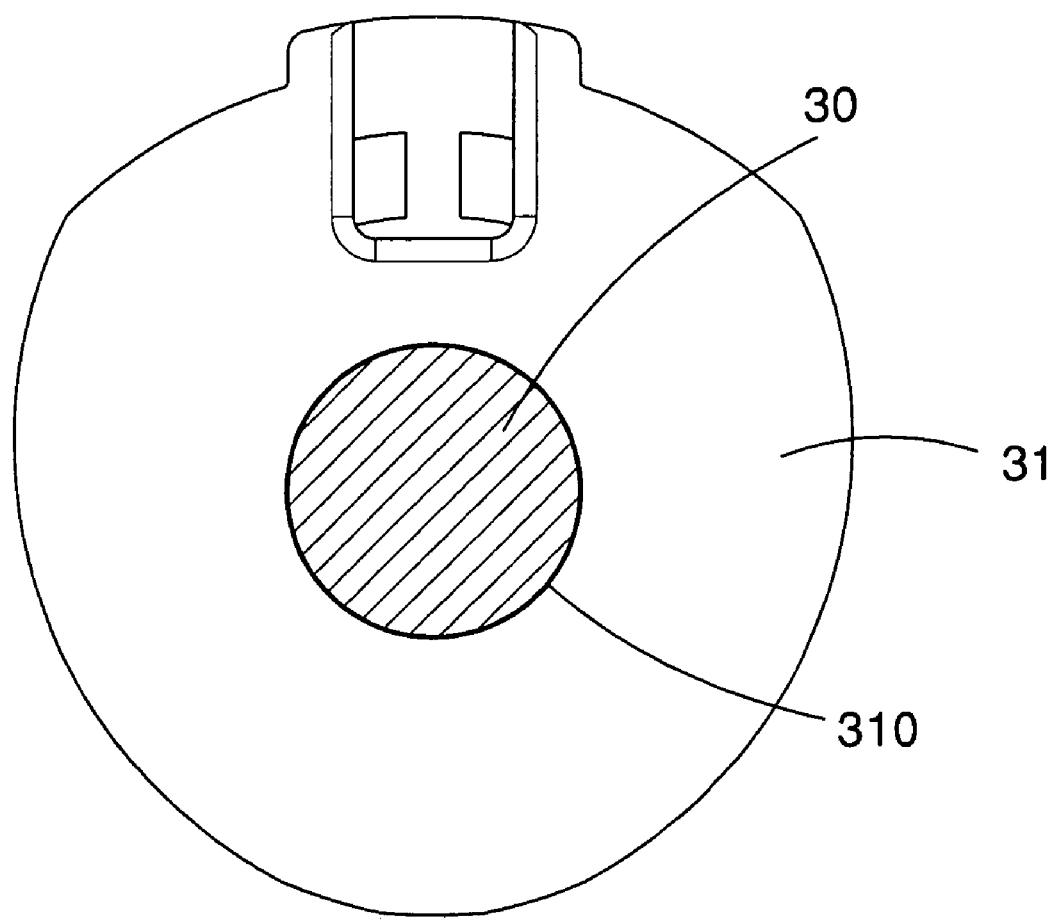
FIG. 21 is a partially top plan cross-sectional view of the conventional ceramic control valve as shown in FIG. 18.

Referring to FIG. 17, the control lever 23a is made of metallic material to match a lever seat 22a.

Accordingly, the gaps 24 located between the drive block 230 and the receiving hole 210 keep a smooth circulation of the air flow, thereby preventing the drive block 230 of the control lever 23 from being jammed in the receiving hole 210 due to deformation of caused by a heat expansion, so that the control lever 23 is operated normally.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A ceramic control valve comprising:
   a valve casing; and
   a control device mounted in said valve casing, said control device comprising:
   a ceramic disk assembly having a fixed disk and a movable disk laminating and movable relative to said fixed disk so as to change a mixing proportion of cold water and hot water and to change an output flow rate;

a linking seat secured on said movable disk of said ceramic disk, said linking seat having a receiving hole formed therein;

a lever seat laminating said linking seat; and a control lever rotatably mounted in said lever seat, said control lever having a first end protruding from said valve casing and a second end formed with a drive block inserted into said receiving hole of said linking seat, said drive block having a spherical surface, said receiving hole of said linking seat having a wall, said receiving hole having a portion in contact with said spherical surface and a second portion spaced from said spherical surface so as to form a plurality of gaps between said second portion of said receiving hole and said spherical surface, a diameter of said drive block being greater than a maximum width of each of said plurality of gaps, said first portion of said receiving hole having four flat faces, said second portion of said receiving hole having four arcuate faces located respectively between said four flat faces.

2. The ceramic control valve of claim 1, said drive block being a spherical body.

3. The ceramic control valve of claim 1, said drive block being a semi-spherical body.

4. The ceramic control valve of claim 1, said fixing disk having a hot water inlet and a cold water inlet and a water outlet, said movable disk having a regulating recess matching a position of each of said hot water inlet and said cold water inlet and said water outlet of said fixing disk so as to change the mixing proportion of the cold water and the hot water and the output flow rate.

5. The ceramic control valve of claim 4, each of said hot water inlet and said cold water inlet of said fixing disk having a side with at least one inward guiding oblique face with a thickness gradually increased outward from a top face to a bottom face thereof, said water outlet of said fixing disk having at least one guiding oblique face with a thickness gradually increased outwardly from a bottom face to a top face thereof and having an expansion slot extending outwardly therefrom.

6. A linking seat comprising:

a drive block having a spherical surface; and a receiving hole having a wall with a first portion in contact with said spherical surface of said drive block and a second portion spaced from said spherical surface so as to form a plurality of gaps between said second portion of said receiving hole and said spherical surface of said drive block, a diameter of said drive block being greater than a maximum width of each of said plurality of gaps.

7. The linking seat of claim 6, said first portion of said receiving hole having four flat faces, said second portion of said receiving hole having four arcuate faces located respectively between said four flat faces.

* * * * *